United States Patent
Muscariello et al.

(10) Patent No.: US 9,712,602 B2
(45) Date of Patent: Jul. 18, 2017

(54) TECHNIQUE FOR COMMUNICATION IN A COMMUNICATIONS NETWORK WITH ROUTING BY NAME

(75) Inventors: Luca Muscariello, Chatenay-Malabry (FR); Massimo Gallo, Issy les Moulineaux (FR)

(73) Assignee: ORANGE, Paris (FR)

( * ) Notice: Subject to any disclaimer, the term of this patent is extended or adjusted under 35 U.S.C. 154(b) by 173 days.

(21) Appl. No.: 14/005,439

(22) PCT Filed: Mar. 12, 2012

(86) PCT No.: PCT/FR2012/050512
§ 371 (c)(1),
(2), (4) Date: Sep. 16, 2013

(87) PCT Pub. No.: WO2012/123670
PCT Pub. Date: Sep. 20, 2012

(65) Prior Publication Data
US 2014/0006565 A1 Jan. 2, 2014

(30) Foreign Application Priority Data
Mar. 15, 2011 (FR) ..................... 11 52102

(51) Int. Cl.
*G06F 15/16* (2006.01)
*H04L 29/08* (2006.01)
*G06F 12/12* (2016.01)

(52) U.S. Cl.
CPC .......... *H04L 67/10* (2013.01); *H04L 67/2833* (2013.01); *G06F 12/12* (2013.01); *H04L 29/08* (2013.01)

(58) Field of Classification Search
None
See application file for complete search history.

(56) References Cited

U.S. PATENT DOCUMENTS

| 5,631,694 A * | 5/1997 | Aggarwal | H04N 7/17336 348/E7.073 |
| 6,925,499 B1 * | 8/2005 | Chen | H04N 7/17336 348/E5.008 |

(Continued)

OTHER PUBLICATIONS

International Search Report and Written Opinion dated May 23, 2012 for corresponding International Application No. PCT/FR2012/050512, filed on May 23, 2012, 12 pages.
French Search Report and Written Opinion dated Sep. 1, 2011 for corresponding French Patent Application No. 11 52102 filed on Mar. 15, 2011.

(Continued)

*Primary Examiner* — Viet Vu
*Assistant Examiner* — James Edwards
(74) *Attorney, Agent, or Firm* — David D. Brush; Westman, Champlin & Koehler, P.A.

(57) ABSTRACT

A method and routing device are provided for aggregating of requests relating to a data segment of a stream into another request and for storing data segments belonging to different streams in a queue prior to the device routing them to client entities that have requested them. The method includes: determining a credit associated with a stream, the credit varying based on a number of requests transmitted by client entities and relating to data segments belonging to the stream; and, on receiving a data segment in response to the other request, and when memory space available in the queue does not enable the received data segment to be stored: selecting a stream having at least one data segment stored in the queue and for which the associated credit is the smallest; and deleting from the queue a data segment belonging to the selected stream.

10 Claims, 2 Drawing Sheets

(56) References Cited

U.S. PATENT DOCUMENTS

| | | | |
|---|---|---|---|
| 8,863,204 B2* | 10/2014 | Whyte | H04N 21/222 709/219 |
| 2002/0049841 A1* | 4/2002 | Johnson | H04L 67/10 709/225 |
| 2002/0085506 A1* | 7/2002 | Hundscheidt | H04L 12/185 370/254 |
| 2003/0115609 A1* | 6/2003 | Frederickson | H04N 7/17318 725/93 |
| 2003/0229899 A1* | 12/2003 | Thompson | H04N 7/17318 725/87 |
| 2004/0100983 A1* | 5/2004 | Suzuki | H04L 12/185 370/432 |
| 2004/0174883 A1* | 9/2004 | Johansson | H04L 45/302 370/395.31 |
| 2007/0174471 A1* | 7/2007 | Van Rossum | H04L 29/06 709/229 |
| 2008/0019371 A1* | 1/2008 | Anschutz | H04L 47/10 370/394 |
| 2009/0016217 A1* | 1/2009 | Kashyap | H04L 47/2408 370/231 |
| 2009/0252219 A1* | 10/2009 | Chen | H04L 12/5693 375/240.02 |
| 2010/0107206 A1* | 4/2010 | White | H04N 7/24 725/109 |
| 2010/0228875 A1* | 9/2010 | Myers | H04L 65/608 709/231 |

OTHER PUBLICATIONS

Zhang Lixia et al.: "Named Data Networking (NDN) Project NDN-001", Internet Citation, Oct. 31, 2010 (Oct. 31, 2010), pp. 1-26, XP002660910, Available Online at: http://www.named-data.net/ndn-proj.pdf.

Wang J: "A Survey of Web Caching Schemes for the Internet", Computer Communication Review, ACM, New York, NY, US, vol. 29, No. 5, Oct. 1, 1999 (Oct. 1, 1999), pp. 36-46, XP000927253.

Kai Cheng et al.: "Multicache-based content management for Web caching", Web Information Systems Engineering, 2000, Proceedings of the First International Conference on Hong Kong, China Jun. 19-21, 2000, Los Alamitos, CA, USA, IEEE Comput. Soc, US, vol. 1, Jun. 19, 2000 (Jun. 19, 2000), pp. 42-29, XP010521835.

Konstantinos Katsaros et al.: "A Hybrid Overlay Multicast and Caching Scheme for Information-Centric Networking", INFOCOM IEEE Conference on Computer Communications Workshops, 2010, IEEE, Piscataway, NJ, USA, Mar. 15, 2010 (Mar. 15, 2010), pp. 1-6, XP031677426.

Van Jacobson et al.: "Networking Named Content", Conext '09 Proceedings of the 5th International Conference on Emerging Networking Experiments and Technologies; Dec. 1-4, 2009; Rome, Italy, Association for Computing Machinery, New York, NY, USA, Dec. 1, 2009 (Dec. 1, 2009), pp. 1-12, XP002608160.

International Preliminary Report on Patentability and Written Opinion in English dated Sep. 17, 2013 for corresponding International Application No. PCT/FR2012/050512, filed on May 23, 2012, 10 pages.

* cited by examiner

TECHNIQUE FOR COMMUNICATION IN A COMMUNICATIONS NETWORK WITH ROUTING BY NAME

CROSS-REFERENCE TO RELATED APPLICATIONS

This Application is a Section 371 National Stage Application of International Application No. PCT/FR2012/050512, filed Mar. 12, 2012, which is incorporated by reference in its entirety and published as WO 2012/123670 on Sep. 20, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to a technique for communication in a communications network centered on information, and implementing routing by name.

BACKGROUND OF THE DISCLOSURE

The article by Van Jacobson et al. entitled "Networking named content" and published in 2009 in the Proceedings of the CoNEXT'09 Conference, describes a novel architecture centered on contents, known as "content-centric networking". That architecture proposes changing the present communications model that is based on physical addressing in the network by a new communications model that is based on addressing by content names.

A stream may be delivered for various applications, optionally in real time, and it is identified in the communications network by a stream name or identifier. The stream is made up of data segments. A data segment is identified by the stream identifier together with a segment number.

More precisely, in order to obtain a data segment of a stream, a client entity sends a request relating to the data segment, which request is referred to as an "interest packet". On receiving the request, a routing node verifies whether it has the looked-for data segment. If so, it then sends it to the interface via which the request was received, so that it can be received by the client entity, possibly passing via other routing nodes, where applicable. If the routing node does not have the looked-for data segment, it checks a pending interest table (PIT) of pending requests to verify whether it has already transmitted a request relating to the same data segment. If not, it stores the identifier of the looked-for data segment in the PIT in association with an identifier of the interface from which the request relating to the looked-for data segment was received. Thereafter it routes the request through the communications network as a function of the stream identifier. Otherwise, i.e. when the PIT already includes the identifier of the looked-for data segment, it does not transmit the request it has received, but acts in the PIT to associate the identifier of the looked-for data segment with an identifier of the interface via which the request was received. In this communications model, it can be seen that each routing node serves to aggregate requests relating to a given data segment of a stream. At various steps in the processing of the data segment, the routing device might put the data segments into a queue prior to routing them. In the event of congestion in one of the queues of the routing node, a new received data segment is generally not stored and consequently is not routed. The effect of not routing this data segment, given the aggregation function of the routing node, is to fail to satisfy a plurality of client entities that have requested the data segment. The number of client entities involved depends on the amount of aggregation that has been performed during the processing of the request relating to a data segment of the stream. It should be recalled that in the conventional communications model, in a packet-switched communications network with physical addressing, only one client entity is impacted by the deletion of a packet that it has requested.

SUMMARY

In a first aspect, the invention provides a communications method implemented by a routing device in a communications network that performs routing by name, said device being suitable for aggregating a plurality of requests relating to a data segment of a stream into another request and for storing data segments belonging to different streams in a queue prior to the device routing them to client entities that have requested them, this method comprising:

a step of determining a credit associated with a stream, said credit varying as a function of a number of requests transmitted by client entities and relating to data segments belonging to the stream; and     on receiving a data segment in response to said other request, and when the memory space available in the queue does not enable said received data segment to be stored:

a step of selecting a stream, in which a stream is selected that has at least one data segment stored in the queue and for which the associated credit is the smallest; and         a step of deleting from the queue a data segment belonging to the selected stream;

said method further comprising a step of routing the data segment to client entities that have requested it, after extracting it from the queue.

Applications transmit data segments relating to a stream. For example they may be applications such as services for broadcasting contents in real time, on request or indeed "live". They may equally well be telephony applications in which segments are stored in order to mitigate potential loss of segments. No limitation is associated with the type of application.

Such data segments may be objects or they may be pieces of an object, or indeed they may be packets.

The communications network is a network centered on contents. It thus performs routing by name and it aggregates requests relating to a data segment of a stream.

Thus, by means of the invention, it is possible to limit the number of client entities that are concerned by a data segment being deleted. This reduces the load placed on the communications network when the client entities involved with requests relating to the deleted data segment renew their requests.

According to a particular characteristic, the credit associated with a stream is updated by said device on receiving a request relating to a data segment of the stream and as a function of another credit associated with the stream and included in said request.

The credits associated with the stream are thus transmitted progressively by the routing devices along the paths towards the entity that has the requested data segment. The credit associated with the stream as determined by the routing device then takes account of all of the requests that have been transmitted in a tree structure established between the client entities and leading to the routing device by means of the PIT. It should be recalled that in this type of communications network, each routing device transmits only one of the requests relating to a data segment of a stream by aggregating the various requests. By taking account of the other credit associated with the stream as determined by the routing device that transmitted the request, performance is improved during selection of the stream.

According to another particular characteristic, the credit associated with the stream is determined by a moving average between a preceding value of the credit associated with the stream and said other credit associated with the stream.

The credit associated with the stream thus varies in a regular manner, without any large variations.

According to another particular characteristic, the deletion step is reiterated, and the stream selection step is possibly also reiterated, so long as the memory space available in the queue is not sufficient for storing the received data segment.

According to another particular characteristic, a routing device that is directly connected to a client entity initializes the credit associated with the stream in the request relating to a data segment of the stream received from the client entity.

As a result, no modification is requested of the client entity and behavior is uniform within the communications network.

The routing device that initializes the credit associated with the stream in the request may be an access gateway to the network or it may be access multiplexer equipment.

It is also possible for the client entity itself to initialize the credit associated with the stream conveyed by the request relating to the data segment of the stream that it is transmitting.

According to another particular characteristic, the credit associated with the stream is re-initialized when there is no pending request relating to a data segment of said stream.

Thus, the credit associated with the stream is representative of the popularity of the stream, which popularity may be entirely temporary.

In a second aspect, the invention also provides a routing device in a communications network that performs routing by name, the device being arranged to aggregate a plurality of requests relating to a data segment of a stream into another request:
  storage means for storing data segments belonging to different streams in a queue in order to route them to client entities that have requested them;
  determination means for determining a credit associated with a stream, said credit varying as a function of a number of requests transmitted by client entities and relating to data segments belonging to the stream;
  routing means for routing a data segment to client entities that have requested it, after extracting the segment from the queue;
  stream selection means arranged to select a stream having at least one data segment stored in the queue and for which the associated credit is the smallest; and
  deletion means for deleting a data segment belonging to the selected stream from the queue;

said selection and deletion means being activated when the memory space available in the queue does not enable a received data segment to be stored.

According to a particular characteristic, the device further includes routing means for routing within the network requests sent by client entities, the routing means being arranged to insert credit into a request relating to a data segment of a stream, the inserted credit being the credit associated with the stream as determined by the determination means.

In a third aspect, the invention also provides a communications network including a routing device as described above.

In a fourth aspect, the invention provides a program for a routing device, the program comprising program code instructions for controlling the execution of steps of the method as described above when said program is executed by said device, and a recording medium readable by a routing device and having recorded thereon a program for a routing device.

BRIEF DESCRIPTION OF THE DRAWINGS

The invention can be better understood with the help of the following description of particular implementations of the method of the invention, with reference to the following drawings, in which.

DETAILED DESCRIPTION OF ILLUSTRATIVE EMBODIMENTS

Figure 1:
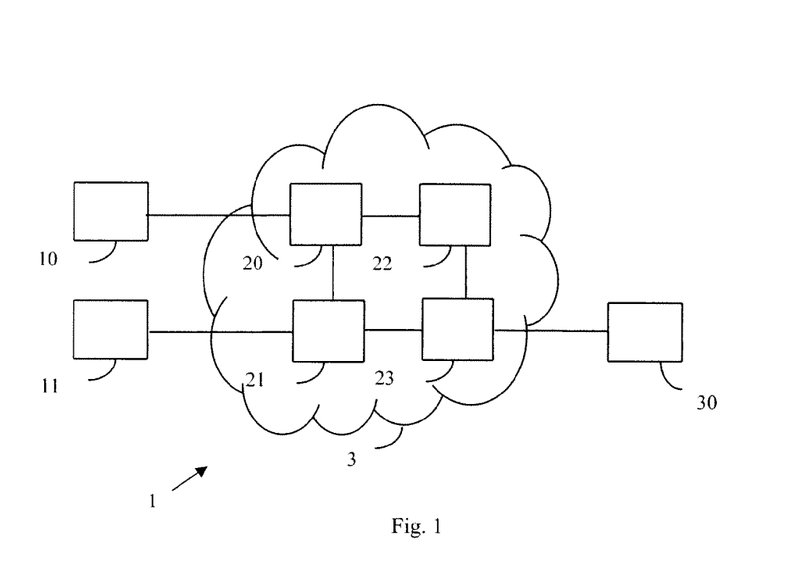
FIG. 1 shows a communications network.

FIG. 1 shows a communications network 1 enabling two client entities 10 and 11 to access various applications such as television, video on demand, or the Internet. Each client entity 10, 11 is connected to an access network 3. The access network enables the client entities to access applications implemented by servers, with one of them, the server 30, being shown in FIG. 1.

When a client entity 10, 11 accesses a given application implemented by the server 30, data segments relating to the given application are exchanged from the server 30 to the client entity 10, 11. Such data segments may be objects or indeed pieces of an object, or else packets.

This may involve browsing a web site that has data segments. This may equally well involve a content broadcast application, for example having architecture of the content delivery network (CDN) type.

The description below relates to the particular situation in which the communications network is centered on information-centric networking (ICN). By way of non-limiting example, the communications network uses name-based addressing mechanisms, such as those described in the above-mentioned article by Van Jacobson et al. and entitled "Networking named content". Such a communications network is also known as a content-centric network (CCN). By way of non-limiting example, according to that article, a stream identifier Id_F is organized as follows:
  a prefix corresponding to a routable name, e.g. "parc.com"; and a name within the organization, e.g. "videos/Widget-A.mpg".

A data segment belonging to a stream is identified by the stream identifier, by time information, and by information relating to a segment number.

In this example, the data segment is identified "/parc.com/videos/WidgetA.mpg/_v<timestamp>/_s3".

More precisely, the client entity 10 sends one or more requests relating to data segments. In the particular circumstance in which the server 30 has those data segments, it sends them to the client entity. The data segments then transit via the access network 3 to the client entity.

Figure 4:
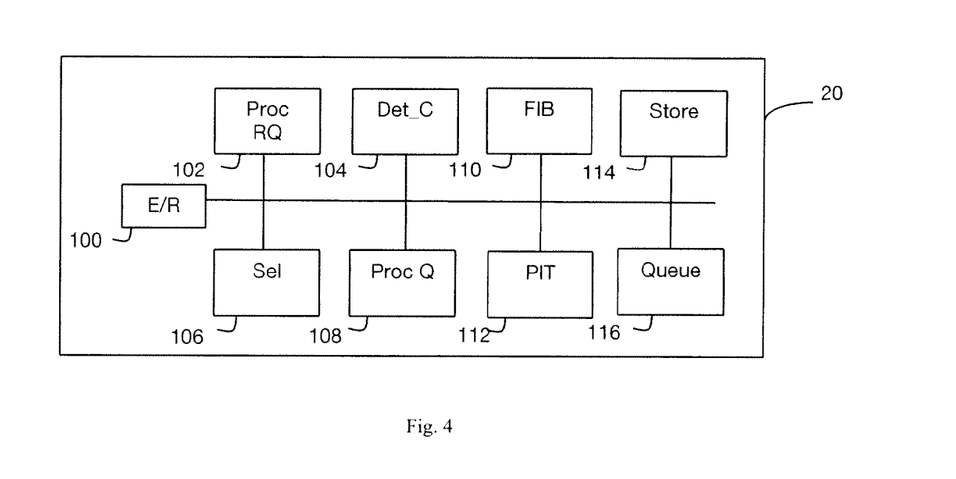
FIG. 4 shows a routing device in a particular embodiment of the invention.

The access network 3 has routing devices 20, 21, 22, 23. These routing devices 20-23 (one of which, namely the routing device 20, is shown in FIG. 4) in this type of communications network comprise three data structures:
- a first table 110, referred to as a forwarding information base (FIB) routing table, and arranged to store routing data, and more specifically a list of interfaces associated with a prefix;
- a second table 112, referred to as a pending interest table (PIT), and arranged to store a list of interfaces whereby one or more requests relating to a data segment of a stream has been received; and
- storage means 114, referred to as a "content store", and arranged to store data segments.

Such a routing device may be a router of the network, an access gateway to the network, or access multiplexer equipment.

The client entity 10 seeking to obtain a data segment of a stream sends an interest packet (IP) request that is received by the routing device 20. If that device does not have the requested data segment in the content store 114, the routing device 20 then uses the PIT 112 to verify whether it has already sent a request to another client entity relating to this data segment. If so, it adds to the PIT an identifier of the interface from which it has received the request, in association with an identifier of the looked-for data segment. When the routing device 20 receives the looked-for data segment, it relays it to all of the client entities that have requested it. If it has not yet sent a request relating to this data segment, the routing device 20 stores the identifier of the data segment in association with an identifier of the interface from which it receives the request in the PIT 112. Thereafter, it routes the request to another routing device with the help of the routing table 110. It can thus be seen that the PIT 112 establishes a tree structure going from the client entities to the routing device.

The routing devices 20-23 generally include at least one queue 116 arranged to store data segments for relaying to client entities 10, 11 that have requested them. These may be global queues for all of the streams or else queues implemented using flow ordering techniques of the "flow aware queuing policy" type, such as the "deficit round robin" method.

Figure 3:
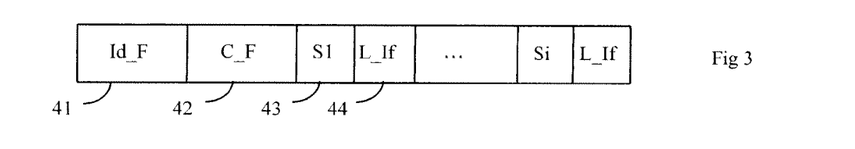
FIG. 3 shows a record relating to a stream in a table of pending requests in a particular implementation.

A portion of the PIT 112, and more precisely a record relating to a stream, is shown in FIG. 3. For a given stream for which a request is pending, as identified by the stream identifier Id_F 41, the record comprises one or more data pairs, where a pair comprises a data segment identifier 43 and a list of interfaces 44. In a first particular implementation of the invention, the PIT 112 includes in association with the stream identifier 41 a credit 42 that is associated with the stream and that varies as a function of the number of requests that have been received from client entities that relate to data segments of this stream.

When no data pair 43-44 is present in the PIT 112, the record relating to the stream is deleted. This makes it possible to re-initialize the credit associated with the stream.

No restriction is attached to this particular implementation. It is also possible in a second implementation to store the credit associated with the stream in a table that is independent from the TIP 112. The credit associated with the stream is then re-initialized when there is no pending request relating to segments of this stream. The stream becomes inactive.

In another particular implementation of the invention, a request relating to a data segment of a stream includes intermediate credit. This intermediate credit is described in greater detail with reference to the description of the communications method.

Figure 2:
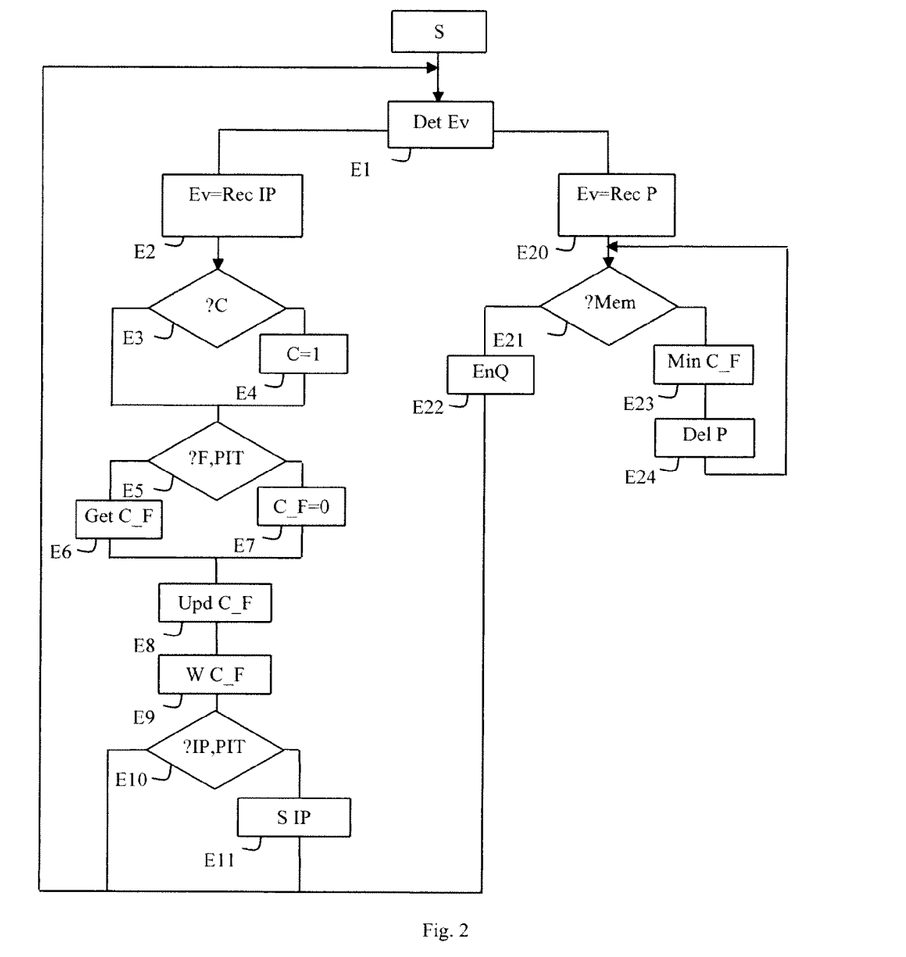
FIG. 2 shows the steps of the method of a particular implementation of the invention.

There follows a description of the communications method, as performed by the routing device 20 in a particular implementation, the description being given with reference to FIG. 2.

In a step E1, the routing device 20 is waiting to receive a data segment or a request relating to a data segment.

In a step E2, the routing device 20 receives a request relating to a data segment of a stream.

In a step E3, the routing device 20 verifies whether the received request includes intermediate credit. If not, the routing device 20 initializes this intermediate credit to the value one in a step E4. It should be observed that under such circumstances the routing device to which the client entity is connected, referred to as an input device, initializes the intermediate credit. No modification is required in the client entity in order to perform the communications method. The input device may be a gateway that is connected to the client entity, or it may be access multiplexer equipment of the digital subscriber line access multiplexer (DSLAM) type.

In a step E5, the routing device 20 acts as a function of the stream identifier to verify whether a record relating to the stream is present in the PIT 112, i.e. whether at least one request relating to a stream data segment is pending. If so, then in a step E6, the routing device obtains the credit C_F associated with the stream from the field 42 of the PIT 112.

If the stream is not present in the PIT 112, then in a step E7, the routing device 20 initializes the credit associated with the stream to the value zero.

In a step E8 of determining the credit C_F associated with the stream, the routing device 20 updates the credit associated with the stream as a function of the intermediate credit associated with the stream. More precisely, the credit associated with the stream is determined by a moving average between a preceding value for the credit associated with the stream and the intermediate credit associated with the stream. This may be performed using the following equation:

$$C\_F = \alpha * C\_F + (1-\alpha) * \text{credit}(IP)$$

where the intermediate credit is written credit (IP), and where α is a parameter lying in the range zero to one.

The parameter α thus serves to weight the intermediate credit received in a request. Variations in the credit associated with the stream are thus smoothed.

By way of example, α may be selected to be equal to 0.9.

It can thus be seen that the credit associated with the stream varies as a function of the number of requests that have been received from client entities and that relate to data segments belonging to the stream. When the number of requests from client entities relating to data segments of this stream is high, the credit associated with the stream increases. Conversely, when the number of requests from client entities relating to data segments of this stream decrease, the credit associated with the stream likewise decreases. The credit associated with the stream may thus be representative of the popularity of the stream.

It is recalled at this point that the credit associated with a stream is reset to zero when there is no request relating to a data segment of the stream that is still pending. The credit associated with a stream is thus stored for active streams only. This serves to limit additional requirements for memory means. This also makes it possible to track variations in the popularity of streams, it being entirely possible for a stream that is popular in a given period to become obsolete quite quickly.

In a step E9, the routing device 20 updates the credit associated with the stream in the field 42 in the PIT 112.

In a step E10, the routing device 20 verifies in the PIT 112 whether a request relating to this data segment has already been sent. If so, then in conventional operation the request is not relayed and the interface from which the request was received is added in association with the identifier of the data segment. The method then returns to step E1 of waiting for reception.

Otherwise, in a step E11, the routing device 20 updates the intermediate credit in the received request with the credit associated with the stream as determined in step E8, and it routes the request as a function of the routing data stored in the routing table 110. The method then moves on to step E1 of waiting for reception. It should be observed that in the invention a request relating to a data segment in a stream includes an additional field for the purpose of conveying the credit that is associated with the determined stream to some other routing device situated on the path to the server 30. This credit corresponds to the intermediate credit that is to be used when performing the step E8 of determining credit associated with the stream in the communications method performed by such an other routing device. It is also emphasized that the request relating to the data segment of the stream received by the input device, i.e. the routing device to which the client entity is directly connected, does not have this additional field. The input device is thus in charge of initializing the additional field carrying the credit information.

It can thus be observed that the intermediate credit used for determining the credit associated with the stream corresponds to the credit associated with the stream as determined by some other routing device that has transmitted the request. Thus, the credit associated with the stream also takes account of the degree of aggregation of requests relating to data segments of this stream as performed by the other routing device, and indirectly by yet more other routing devices situated on the tree structure serving to reach the client entities.

In a variant implementation, the steps E3 and E4 need not be performed. Under such circumstances, the client entity 10 initializes the intermediate credit in the request to the value one.

In a step E20, the routing device 20 receives a data segment of a stream. It is emphasized at this point that by using the information stored in the PIT 112, a data segment follows paths to the client entities that have requested it that are exactly the reverse of the paths followed by the request.

In a step E21, the routing device 20 verifies whether the memory space available in the queue 116 can store the received data segment.

If so, in a step E22, the routing device 20 stores the received data segment in the queue 116. The method then returns to step E1 of waiting for reception.

Otherwise, i.e. when the memory space available in the queue 116 does not make it possible to store the received data segment, then in a step E23 of selecting a stream, the routing device 20 selects a stream having at least one data segment stored in the queue and for which the associated credit is smaller.

Thereafter, in a deletion step E24, the routing device 20 deletes a data segment forming part of the stream selected in step E23 from the queue 116. The method then returns to step E21 in order to verify whether the memory space has been freed up sufficiently.

In a variant implementation, in the step E24, the routing device 20 deletes as many data segments as necessary to release the memory space needed for storing the received data segment.

The deleting step E24 is thus repeated, and where necessary the stream selection step E23 is also repeated, so long as the memory space available in the queue continues to be insufficient for storing the received data segment.

Thus, by selecting the stream presenting the smallest associated credit, the deletion of one or more data segments from the stream minimizes the number of client entities that will be involved by such deletion. Deleting the data segment will cause the client entities in question to send new requests relating to the data segment. When the client entities in question renew their requests, the impact in terms of load on the communications network is also minimized.

It is emphasized at this point that the credit associated with the stream has meaning that is local to the routing device. Nevertheless, the communications method as described above makes it possible to take account of aggregations performed by other routing devices situated on the return path back to the requesting client entity.

It is also possible to select as credit associated with the stream directly the number of requests relating to data segments of the stream. In a variant, the number of requests is counted over a determined period and is normalized as a function of the number of requests relating to all of the active streams.

More generally, credit associated with the stream may vary in application of an increasing monotonic function of the number of requests relating to data segments of the stream. An example of such a function is the logarithmic function.

In the particular implementation described above, the direction in which the credit associated with the stream varies is the same as the direction in which the number of requests relating to data segments of the stream varies. It is possible to make other implementation choices, in particular having variation in the opposite direction, in which case the stream is selected that presents the highest associated credit.

There follows a description of a routing device in a particular embodiment of the invention, given with reference to FIG. 4. Such a device 20 is arranged to process data segments belonging to different streams, and it comprises:
- the routing table or FIB 110 as described above;
- the pending request table or PIT 112 as described above;
- the memory means 114 or content store as described above;
- the queue 116 as described above;
- a communications module 100 for communicating with other devices of the communications network, arranged to send and receive data, in particular requests relating to data segments belonging to a stream, and also data segments;
- a module 102 for processing requests relating to data segments, the module being arranged in particular to route requests by using the routing data stored in the routing table 110 and to transmit the data segments to those client entities that have requested them by using the PIT 112;

a module 104 for determining the credit (C_F) associated with a stream, said credit varying as a function of the number of requests received from client entities and relating to data segments belonging to the stream;

a stream selector module 106 arranged to select a stream having at least one data segment stored in the queue 116 and for which the associated credit is the smallest; and a module 108 for managing the queue 116.

The module 108 is arranged in particular for storing a received data segment in the queue 116, for deleting from the queue 116 a data segment belonging to the selected stream, and for extracting from the queue 116 a data segment to be routed. The module 108 is also arranged to determine the memory space available in the queue 116 and to activate the selector module 106 when the available memory space in the queue is not sufficient for storing a received data segment, in order to obtain in return a selected stream.

In a particular implementation, the processor module 102 is also arranged to insert into a request relating to a data segment of a stream the credit that is associated with the stream as determined by the determination module 104 and to extract intermediate credit from a request relating to a data segment of a stream.

The modules 102, 104, 106, and 108 are arranged to perform the above-described method. They are preferably software modules having software instructions for causing the steps of the above-described method to be executed when performed by the routing device. The invention thus also provides:

a program for a routing device, the program including program code instructions for controlling the execution of steps of the above-described method, when said program is executed by said device; and a recording medium readable by a routing device and having recorded thereon the program for a routing device.

The software modules may be stored in or transmitted by a data medium. The data medium may be a hardware storage medium, e.g. a compact disk read only memory (CD-ROM), a floppy disk, or a hard disk, or indeed a transmission medium such as an electrical, optical, or radio signal, or a telecommunications network.

The invention also provides a communications network including at least one routing device as described above.

An embodiment of the invention remedies the insufficiencies and/or drawbacks of the prior art and/or provides improvements thereto.

The invention claimed is:

1. A communications method implemented by a routing device in a communications network that performs routing by name, said device being configured for storing data segments belonging to different streams in a queue prior to the device routing them to client entities that have requested them, this method comprising:

the routing device receiving from a set of respective client entities a respective set of requests, called an "aggregated request", for a data segment A, the routing device transmitting to a server or to another routing device only the first request received among said set of requests for said data segment A, the routing device determining a credit associated with a stream, said credit varying as a function of a number of pending requests, transmitted by client entities and relating to data segments belonging to the stream; and on receiving said data segment A in response to said aggregated request, and when memory space available in the queue does not enable said received data segment to be stored:

selecting a stream of the different streams that has at least one data segment stored in the queue and for which the associated credit is the smallest; and deleting from the queue a data segment B belonging to the selected stream, thus not routing said data segment B to the client entities that have requested the data segment B;

said method further comprising:

storing the data segment A in the queue; and routing the data segment A to client entities that have requested the data segment A, after extracting the data segment A from the queue.

2. A communications method according to claim 1, wherein the credit associated with a stream is updated by said device on receiving a request relating to a data segment of the stream and as a function of another credit associated with the stream and included in said request.

3. A communications method according to claim 2, wherein the credit associated with the stream is determined by a moving average between a preceding value of the credit associated with the stream and said other credit associated with the stream.

4. A communications method according to claim 2, wherein the routing device is directly connected to a client entity and initializes the credit associated with the stream in the request relating to a data segment of the stream received from the client entity.

5. A communications method according to claim 1, wherein the deleting is reiterated, so long as the memory space available in the queue is not sufficient for storing the received data segment A.

6. A communications method according to claim 1, wherein the credit associated with the stream is re-initialized when there is no pending request relating to a data segment of said stream.

7. A routing device in a communications network performing routing by name, the device comprising:

storage means for storing data segments belonging to different streams in a queue in order to route them to client entities that have requested the data segments;

receiving means for receiving from a set of respective client entities a respective set of requests, called an "aggregated request", for a data segment A, transmitting means for transmitting to a server or to another routing device only the first request received among said set of requests for said data segment A, determination means for determining a credit associated with a stream, said credit varying as a function of a number of pending requests: transmitted by client entities and relating to data segments belonging to the stream;

routing means for routing a data segment to client entities that have requested the data segment, after extracting the data segment from the queue;

stream selection means arranged to select a stream having at least one data segment B stored in the queue and for which the associated credit is the smallest; and deletion means for deleting the data segment B belonging to the selected stream from the queue, thus not routing said data segment B to the client entities that have requested the data segment B;

said selection and deletion means being activated when memory space available in the queue does not enable said data segment A, received in response to said aggregated request, to be stored, and said storage means being configured for storing the data segment A in the queue after the deletion means deletes data segment B from the queue.

8. A routing device according to claim 7, further including routing means for routing within the network requests sent by client entities, the routing means being arranged to insert credit into a request relating to a data segment of a stream, the inserted credit being the credit associated with the stream as determined by the determination means.

9. A communications network including at least one routing device according to claim 7.

10. A hardware storage device comprising a program stored thereon for a routing device, the program comprising program code instructions for controlling execution of a communications method, when said program is executed by said routing device, in a communications network that performs routing by name, said device being configured for storing data segments belonging to different streams in a queue prior to the device routing them to client entities that have requested them, wherein the method comprises:

the routing device receiving from a set of respective client entities a respective set of requests, called an "aggregated request", for a data segment A, the routing device transmitting to a server or to another routing device only the first request received among said set of requests for said data segment A, the routing device determining a credit associated with a stream, said credit varying as a function of a number of pending requests: transmitted by client entities and relating to data segments belonging to the stream; and on receiving said data segment A in response to said aggregated request, and when memory space available in the queue does not enable said received data segment A to be stored:

selecting a stream that has at least one data segment stored in the queue and for which the associated credit is the smallest; and deleting from the queue a data segment B belonging to the selected stream, thus not routing said data segment B to the client entities that have requested the data segment B;

said method further comprising:

storing the data segment A in the queue; and routing the data segment A to client entities that have requested the data segment A, after extracting the data segment A from the queue.

* * * * *

UNITED STATES PATENT AND TRADEMARK OFFICE
CERTIFICATE OF CORRECTION

PATENT NO. : 9,712,602 B2
APPLICATION NO. : 14/005439
DATED : July 18, 2017
INVENTOR(S) : Luca Muscariello et al.

Page 1 of 1

It is certified that error appears in the above-identified patent and that said Letters Patent is hereby corrected as shown below:

In the Claims

In Claim 7, Column 10, Line 55, delete ":" and insert --,--

Signed and Sealed this
Twelfth Day of March, 2019

Andrei Iancu
*Director of the United States Patent and Trademark Office*